(12) United States Patent
Nakajima et al.

(10) Patent No.: US 8,979,158 B2
(45) Date of Patent: Mar. 17, 2015

(54) LUGGAGE COMPARTMENT STRUCTURE OF VEHICLE

(71) Applicant: KYORAKU Co., Ltd., Kyoto (JP)

(72) Inventors: Sho Nakajima, Kanagawa (JP);
Tadatoshi Tanji, Kanagawa (JP);
Yoshitaka Matsubara, Kanagawa (JP);
Ryota Baba, Kanagawa (JP)

(73) Assignee: KYORAKU Co., Ltd., Kyoto (JP)

( * ) Notice: Subject to any disclaimer, the term of this patent is extended or adjusted under 35 U.S.C. 154(b) by 0 days.

(21) Appl. No.: 13/737,338

(22) Filed: Jan. 9, 2013

(65) Prior Publication Data

US 2013/0181472 A1 Jul. 18, 2013

(30) Foreign Application Priority Data

Jan. 13, 2012 (JP) ................................. 2012-005425

(51) Int. Cl.
*B60R 5/04* (2006.01)
*B60R 7/02* (2006.01)

(52) U.S. Cl.
CPC .... *B60R 5/04* (2013.01); *B60R 7/02* (2013.01)
USPC ...................................................... 296/37.1

(58) Field of Classification Search
USPC .......... 296/37.1, 37.16, 24.43, 3, 26.09, 57.1; 224/539; 410/34, 35, 94, 97, 118
See application file for complete search history.

(56) References Cited

U.S. PATENT DOCUMENTS

| | | | | |
|---|---|---|---|---|
| 3,110,429 A | * | 11/1963 | Philips ...................... | 296/37.16 |
| 6,045,317 A | * | 4/2000 | Boucher et al. ............... | 414/495 |
| 6,149,219 A | * | 11/2000 | Schambre et al. ........... | 296/57.1 |
| 6,616,389 B1 | * | 9/2003 | Ament et al. ................. | 410/100 |
| 7,131,681 B2 | * | 11/2006 | Kim ........................... | 296/37.16 |

FOREIGN PATENT DOCUMENTS

| | | |
|---|---|---|
| JP | 2001-328488 | 11/2001 |
| JP | 2007-008339 | 1/2007 |
| JP | 2008-087503 | 4/2008 |
| JP | 2010-162925 | 7/2010 |

* cited by examiner

*Primary Examiner* — Joseph D Pape
*Assistant Examiner* — Dana Ivey
(74) *Attorney, Agent, or Firm* — Greenblum & Bernstein, P.L.C.

(57) ABSTRACT

Provided is a luggage compartment structure of a vehicle in which a plate member is able to be installed in various aspects in a luggage compartment of the vehicle, the luggage compartment structure of a vehicle being capable of preventing an article on the plate member from falling using a fall prevention member which is a separate member from the plate member. The luggage compartment structure of a vehicle has a plate member installed in at least two positions including a first position ($\alpha$) of a luggage compartment of the vehicle and a second position ($\beta$) that is higher than the first position ($\alpha$), and a fall prevention member which prevents an article placed on the plate member installed at the second position ($\beta$) from falling, wherein the fall prevention member is detachable from the plate member or the vehicle.

9 Claims, 8 Drawing Sheets

LUGGAGE COMPARTMENT STRUCTURE OF VEHICLE

BACKGROUND

1. Technical Field

The present invention relates to a luggage compartment structure of a vehicle capable of preventing an article placed on a plate member such as a package tray, a deck board, or a floor board installed in a luggage compartment of a vehicle from falling.

2. Related Art

Hitherto, in order to achieve enhancement of convenience of a luggage compartment provided in the rear part of a vehicle, there is a document which discloses a luggage compartment structure of a vehicle in which the luggage compartment is able to be partitioned into a plurality of storage spaces, using plate members such as package trays, deck boards, or floor boards installed in the luggage compartment (for example, refer to JP 2001-328488 A).

For example, in JP 2001-328488 A, a rear package tray provided at a predetermined height position above the rear floor is divided into two sections including a front package tray and a rear package tray in the forward and rearward direction, the front package tray is disposed at an intermediate height position between the rear package tray and the rear floor, and an article is also placed on the front package tray, so as to achieve enhancement of convenience of the luggage compartment.

In JP 2001-328488 A, the front package tray is installed at a plurality of positions (the predetermined height position or the intermediate height position) in the luggage compartment, and the article is placed on the front package tray, thereby achieving enhancement of convenience of the luggage compartment. However, in JP 2001-328488 A, since the front package tray is configured in a flat shape, there is a concern that the article placed on the front package tray may fall.

In addition, various developments in the structure for preventing the article from falling have been made (for example, refer to JP 2008-87503 A, JP 2010-162925 A, and JP 2007-8339 A).

For example, in JP 2008-87503 A, a concave portion is provided in a floor board to cause the concave portion to prevent an article from falling. In addition, in JP 2010-162925 A, a structure of a deck board in which the deck board is able to be bent into two sections, and when the deck board is bent, a protruding portion is formed on the upper surface of the one bent section of the deck board is invented, and the protruding portion prevents an article from falling.

In JP 2008-87503 A and JP 2010-162925 A, by modifying the shape and the structure of the plate member such as the floor board or the deck board, the article is prevented from falling.

However, when the shape of the plate member is modified as in JP 2008-87503 A, the plate member may not be installed in other aspects as it is. For example, in the case where the concave portion is provided in the floor board as in JP 2008-87503 A, when the floor board is used at the predetermined height position, the article may be prevented from falling by the concave portion provided in the floor board. However, when the floor board is used on a flat surface, the concave portion needs to be provided with a cover portion to use the floor board flat.

In addition, when the deck board is bent as in JP 2010-162925 A, in the case of the structure in which the protruding portion is formed on the upper surface of the one bent section of the deck board, the deck board needs to have a complex structure.

From this, while modifying the plate member such as the floor board or the deck board as little as possible, there is a need to realize the prevention of falling of an article.

In addition, in JP 2007-8339 A, a flexible cover is provided at an end portion of a package tray, and by covering the package tray with the flexible cover, an article on the package tray is prevented from falling. However, in JP 2007-8339 A, since the package tray and the flexible cover are integrated with each other, the flexible cover can become obstructive, depending on the installation aspect of the package tray, and thus the package tray may not be installed in a state as it is.

SUMMARY OF THE INVENTION

Considering the above-mentioned circumstances, an object of the present invention is to provide a luggage compartment structure of a vehicle in which a plate member is able to be installed in various aspects in a luggage compartment of the vehicle, the luggage compartment structure of a vehicle being capable of preventing an article on the plate member from falling using a fall prevention member which is a separate member from the plate member.

In order to accomplish the object, the present invention has the following features.

According to the present invention, there is provided a luggage compartment structure of a vehicle including: a plate member installed in at least two positions including a first position and a second position that is higher than the first position of a luggage compartment of the vehicle; and a fall prevention member which prevents an article placed on the plate member installed at the second position from falling, the fall prevention member being detachable from the plate member or the vehicle.

According to the aspects of the present invention, in the luggage compartment structure of a vehicle in which the plate member is able to be installed in various aspects in the luggage compartment of the vehicle, the luggage compartment structure of a vehicle is capable of preventing an article on the plate member from falling using the fall prevention member which is a separate member from the plate member.

DESCRIPTION OF THE EMBODIMENT

Summary of Luggage Compartment Structure of Vehicle of this Embodiment

First, the summary of a luggage compartment structure of a vehicle of this embodiment will be described with reference to FIGS. 3 and 4.

Figure 3:
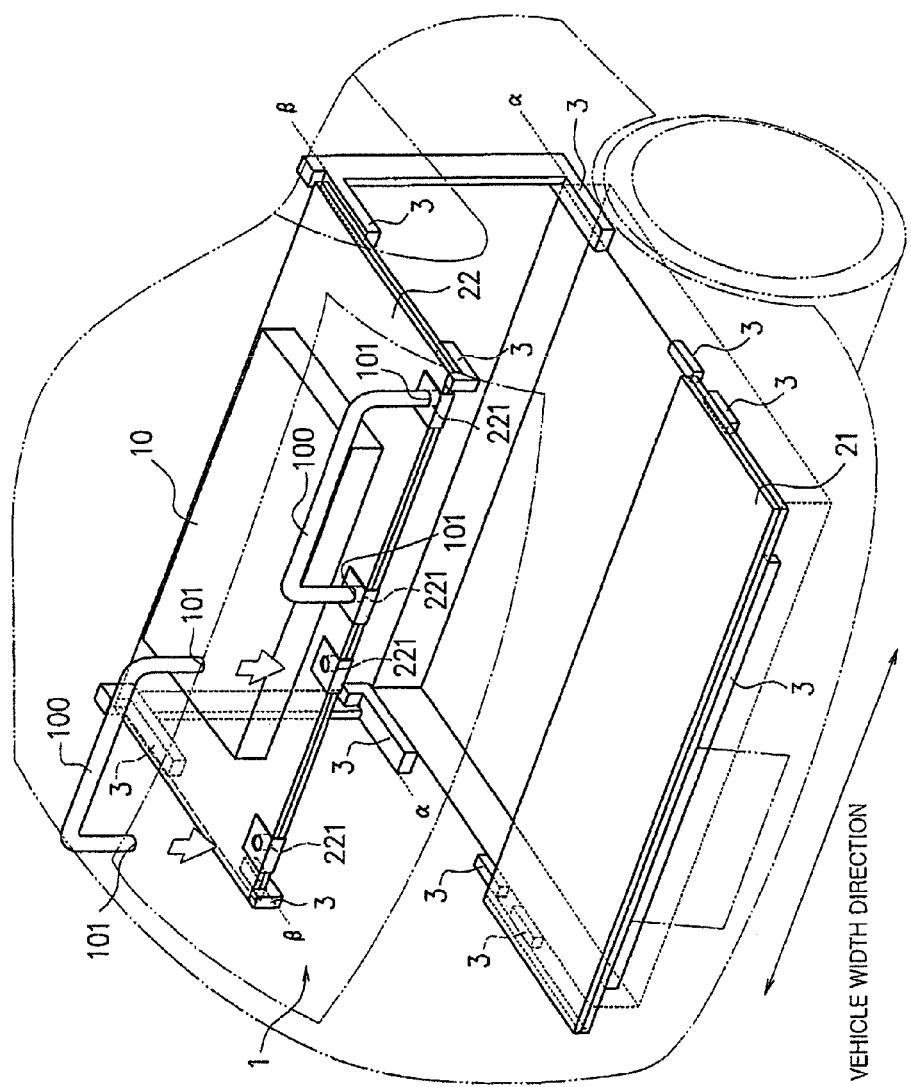
FIG. 3 is a diagram illustrating a configuration example of the luggage compartment 1 of the vehicle of a first embodiment.
Figure 4:
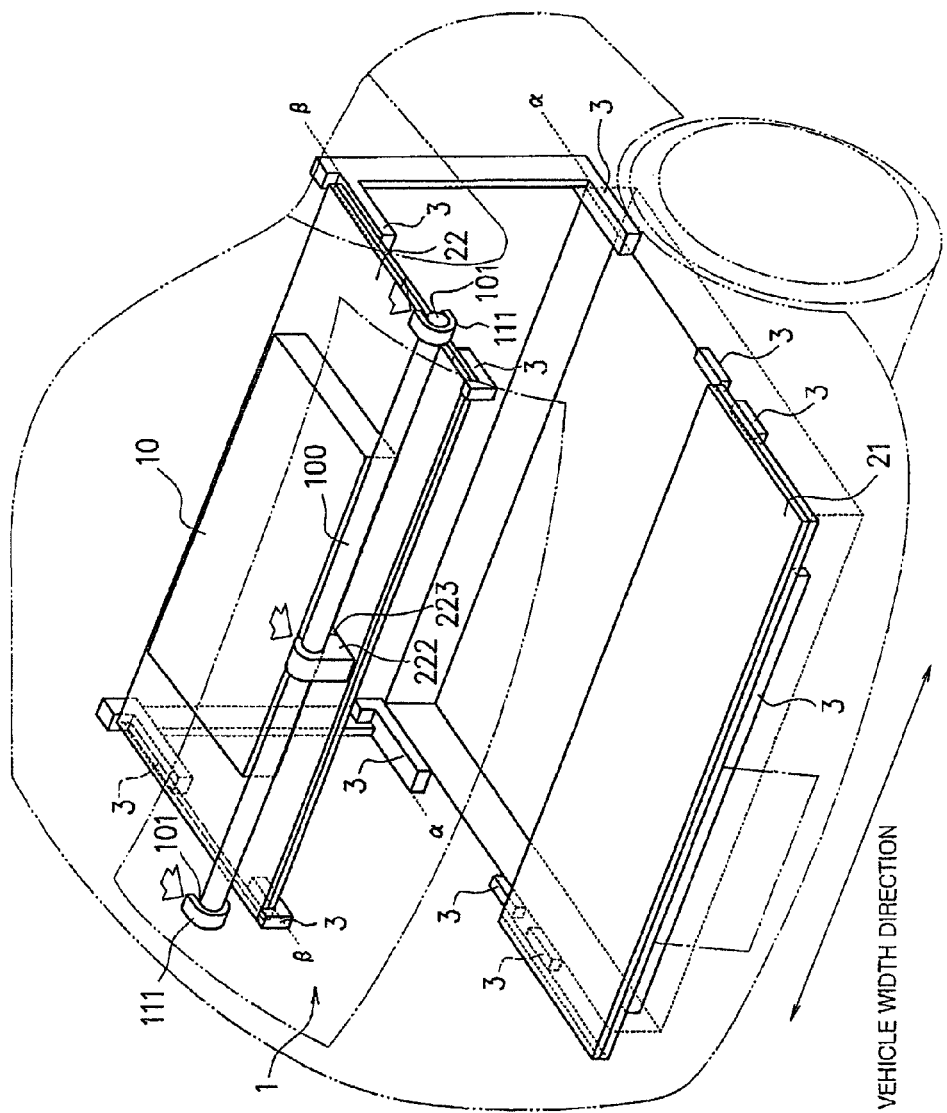
FIG. 4 is a diagram illustrating a configuration example of the luggage compartment 1 of the vehicle of a second embodiment.

As illustrated in FIGS. 3 and 4, the luggage compartment structure of a vehicle of this embodiment is a luggage compartment structure of a vehicle having a plate member (corresponding to a second deck board 22) installed in at least two positions including a first position α of a luggage compartment 1 of the vehicle and a second position β that is higher than the first position α, and a fall prevention member 100 which prevents an article 10 placed on the plate member 22 installed at the second position β from falling.

The fall prevention member 100 of this embodiment is able to be detached from the plate member 22 or the vehicle as illustrated in FIGS. 3 and 4.

Accordingly, the fall prevention member 100 mounted to the plate member 22 or the vehicle is disposed at a position that comes into contact with the article 10 placed on the plate member 22 installed at the second position β and is thus able to prevent the article 10 from falling. Therefore, in the luggage compartment structure of a vehicle in which the plate member 22 may be installed in various aspects in the luggage compartment 1 of the vehicle, the article 10 on the plate member 22 may be prevented from falling using the fall prevention member 100 which is a separate member from the plate member 22. Hereinafter, the luggage compartment structure of a vehicle of this embodiment will be described in detail with reference to the accompanying drawings.

First Embodiment

Configuration Example of Luggage Compartment Structure of Vehicle

Figure 1:
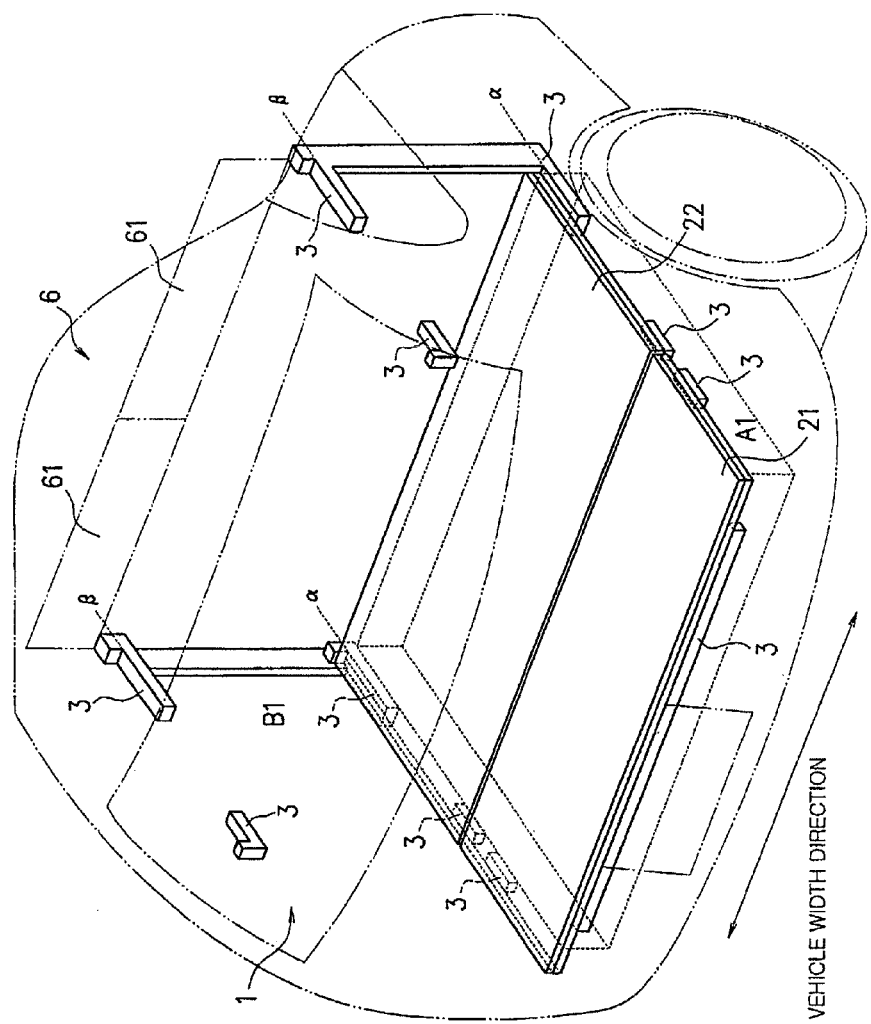
FIG. 1 is a first diagram illustrating a configuration example of a luggage compartment 1 of a vehicle of this embodiment and is a diagram illustrating a state in which a first deck board 21 and a second deck board 22 are installed at a position having the same height.
Figure 2:
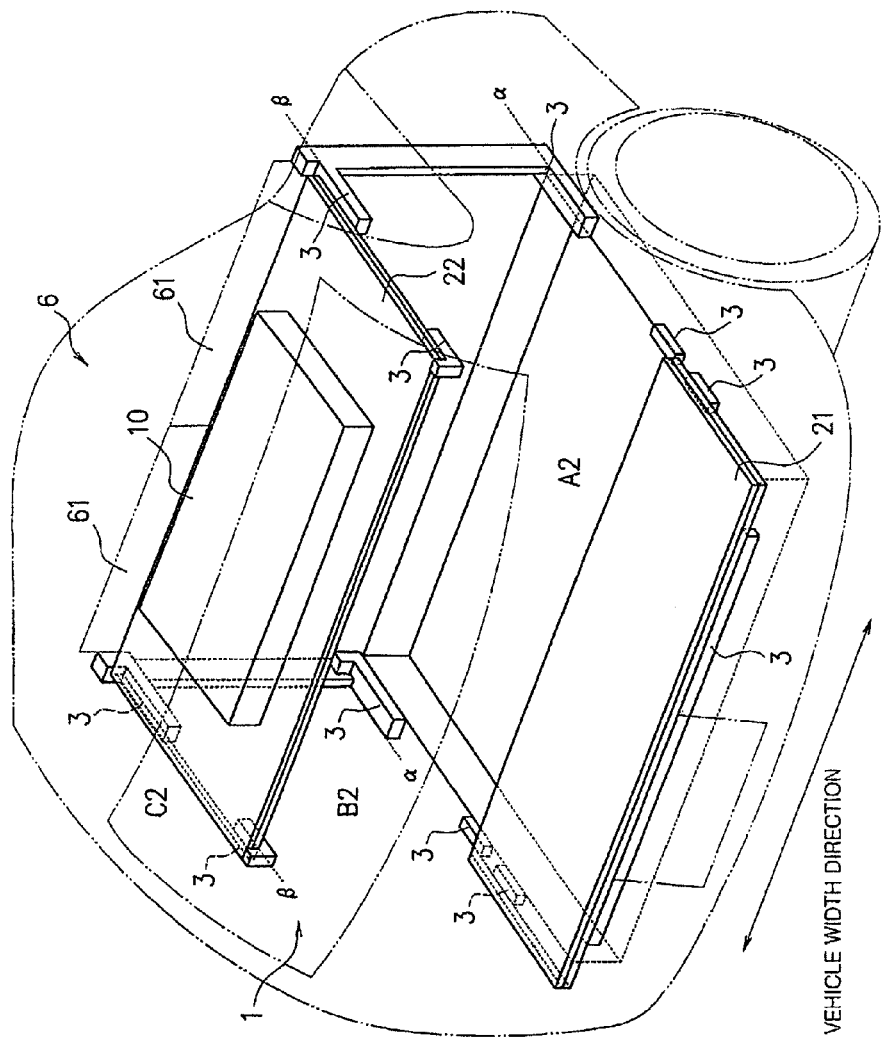
FIG. 2 is a second diagram illustrating the configuration example of the luggage compartment 1 of the vehicle of this embodiment and is a diagram illustrating a state in which the second deck board 22 is installed at a position that is higher than the first deck board 21.

First, a configuration example of the luggage compartment structure of a vehicle of this embodiment will be described with reference to FIGS. 1 and 2. FIGS. 1 and 2 are diagrams illustrating the configuration example of the luggage compartment 1 of the vehicle, FIG. 1 illustrates a state in which a first deck board 21 and the second deck board 22, which are plate members, are installed at a position having the same height (the first position α), and FIG. 2 illustrates a state in which the second deck board 22 which is the plate member is installed at a position that is higher than the first deck board 21 (the second position β). In addition, in FIGS. 1 and 2, for ease of comprehending the luggage compartment structure of a vehicle, parts illustrating the luggage compartment structure of a vehicle are indicated by solid lines, and configurations of other parts are indicated by double-dashed chain lines.

The luggage compartment 1 of this embodiment communicates with a passenger compartment 6 in the rear of the passenger compartment 6. The vehicle width direction of the luggage compartment 1 is partitioned by both side walls (not shown) of the vehicle. The front side in the forward and rearward direction of the luggage compartment 1 is partitioned by a seat back of a seat 61 of the passenger compartment 6. The rear side in the forward and rearward direction of the luggage compartment 1 is partitioned by a door (not shown) provided in the rear of the vehicle. In the luggage compartment structure of a vehicle of this embodiment, various articles may be placed in the luggage compartment 1 by opening the door provided in the rear of the vehicle.

In the luggage compartment 1 of this embodiment, the first deck board 21 and the second deck board 22, which are the plate members, are installed in various aspects so as to be suspended between mounting portions 3 and 3 provided at both side walls of the vehicle. For example, the first deck board 21 and the second deck board 22 are installed in the forward and rearward direction of the vehicle at a predetermined height position (the first position α) of the luggage compartment 1 as illustrated in FIG. 1. In addition, the second deck board 22 is installed at the second position β that is higher than the predetermined height (the first position α) of the luggage compartment 1 as illustrated in FIG. 2.

The second deck board 22 of this embodiment may be installed in a height direction of the vehicle in the luggage compartment 1 in various aspects (the first position α and the second position β described above). Therefore, as illustrated in FIG. 1, in the luggage compartment structure of a vehicle of this embodiment, the luggage compartment 1 is divided into at least two storage spaces (a first storage space A1 and a second storage space B1) by the first position α at which the first deck board 21 and the second deck board 22 are installed, such that various articles may be placed in each of the storage spaces. The first storage space A1 illustrated in FIG. 1 represents a storage space that is lower than the first deck board 21 and the second deck board 22. The second storage space B1 represents a storage space that is higher than the first deck board 21 and the second deck board 22. In addition, as illustrated in FIG. 2, the luggage compartment 1 is divided into at least three storage spaces (a first storage space A2, a second storage space B2, and a third storage space C2) by the first position α at which the first deck board 21 is installed and the second position β at which the second deck board 22 is installed, such that various articles may be placed in each of the storage spaces. The first storage space A2 illustrated in FIG. 2 represents a storage space that is lower than the first deck board 21. The second storage space B2 represents a storage space between the first deck board 21 and the second deck board 22. The third storage space C2 represents a storage space that is higher than the second deck board 22.

In the luggage compartment structure of a vehicle of this embodiment, since the luggage compartment 1 is able to be divided into a plurality of storage spaces using the first deck board 21 or the second deck board 22, enhancement of convenience of the luggage compartment 1 may be achieved. In addition, the material and the shape of the first deck board 21 or the second deck board 22 are not particularly limited and may be configured as arbitrary materials and shapes. Here, the first deck board 21 or the second deck board 22 of this embodiment achieves enhancement of convenience of the luggage compartment 1 by the upper surfaces of the deck boards 21 and 22 on which various articles are placed, and thus it is preferable that the upper surfaces of the deck boards 21 and 22 are configured in flat shapes on which various articles are able to be stably placed.

The deck boards 21 and 22 of this embodiment may be mounted to be detachable from the mounting portions 3. For example, in the case of the aspect illustrated in FIG. 1, the first deck board 21 and the second deck board 22 are detachably mounted to the mounting portions 3 provided at the first position α of both side walls of the vehicle or at a position in the vicinity thereof. In addition, in the case of the aspect illustrated in FIG. 2, the second deck board 22 is detachably mounted to the mounting portions 3 provided at the second position β of both side walls of the vehicle or at a position in the vicinity thereof. In the luggage compartment structure of a vehicle of this embodiment, by detachably mounting the second deck board 22 to the mounting portions 3 provided at various positions of both side walls of the vehicle, the second deck board 22 may be installed at positions (the first position α and the second position β described above) corresponding to the mounting positions of the mounting portions 3 and the second deck board 22.

The material and the shape of the mounting portions 3 provided at both side walls of the vehicle are not particularly limited as long as the first deck board 21 and the second deck board 22 are able to be detachably mounted, and may be configured as arbitrary materials and shapes. For example, as illustrated in FIGS. 1 and 2, plate members having flat surfaces are provided at both side walls of the vehicle as the mounting portions 3, and the end portions of the first deck board 21 or the second deck board 22 may be put on the flat surfaces of the plate members. In addition, hooks are provided at both side walls of the vehicle as the mounting portions 3, and the end portions of the first deck board 21 or the second deck board 22 may be hooked by the hooks. In addition, the mounting structure when the mounting portions 3 are mounted to the vehicle is not particularly limited, and the mounting portions 3 may be mounted to the side wall of the vehicle in an arbitrary mounting structure.

As illustrated in FIGS. 1 and 2, in the luggage compartment structure of a vehicle of this embodiment, the second deck board 22 in the luggage compartment 1 is installed in various aspects (the first position α and the second position β) in the height direction of the vehicle such that enhancement of convenience of the luggage compartment 1 is able to be achieved. However, since the upper surface of the second deck board 22 of this embodiment is flat, as illustrated in FIG. 2, there is a concern that the article 10 placed on the second deck board 22 installed at the second position β may fall off the second deck board 22. In particular, in a case where the vehicle moves, a force is exerted on the article 10 placed in the vehicle in the movement direction of the vehicle, the article 10 moves on the second deck board 22, and thus there may be cases where the article 10 falls off the second deck board 22.

Therefore, in this embodiment, as illustrated in FIG. 3, the fall prevention member 100 is mounted to the end portion on the rear side of the vehicle of the second deck board 22 so as to prevent the article 10 on the second deck board 22 from falling. Accordingly, even though the article 10 on the second deck board 22 moves to the rear of the vehicle, the article 10 comes into contact with the fall prevention member 100 mounted to the end portion of the second deck board 22 so as not to cause the article 10 to fall off the second deck board 22.

The second deck board 22 of this embodiment is installed in various aspects (the first position α and the second position β) in the height direction of the vehicle and thus enhancement of convenience of the luggage compartment 1 is able to be achieved. Therefore, the fall prevention member 100 mounted to the second deck board 22 is detachable from the second deck board 22. Accordingly, in the case where the second deck board 22 is used at the first position α, for example, as illustrated in FIG. 1, the fall prevention member 100 is used in a state of being detached from the second deck board 22 such that the upper surface of the second deck board 22 is flat. As a result, various articles may be placed across the first deck board 21 and the second deck board 22. In addition, in the case where the second deck board 22 is used at the second position β, for example, as illustrated in FIG. 3, the fall prevention member 100 is used in a state of being mounted to the end portion of the second deck board 22 so as not to cause the article 10 to fall off the second deck board 22.

As illustrated in FIG. 3, the fall prevention member 100 of this embodiment is configured as a bent bar-like member, and both ends of the fall prevention member 100 have first connection portions 101. In addition, the second deck board 22 has second connection portions 221. In addition, both ends of the fall prevention member 100 are able to be detachably mounted to the second deck board 22 by connecting the corresponding connection portions 101 and 221.

The second connection portions 221 are provided in the end portion of the second deck board 22, and by connecting the first connection portions 101 to the second connection portions 221, the fall prevention member 100 is detachably mounted to the end portion of the second deck board 22. Any structure may be applied to the second connection portions 221 and the first connection portions 101 as long as the fall prevention member 100 is able to be detachably mounted to the second deck board 22 in the structure. For example, a configuration in which the second connection portion 221 is configured in a concave shape as illustrated in FIG. 3, the first connection portion 101 is configured in a bar shape, the bar-shaped first connection portion 101 is inserted into the concave second connection portion 221 to connect the second connection portion 221 and the first connection portion 101 and detachably mount the fall prevention member 100 to the second deck board 22 is possible. In addition, the fall prevention member 100 is detachably mounted to the rear surface side of the second deck board 22, and when the fall prevention member 100 is used, the fall prevention member 100 may be detached from the rear surface side of the second deck board 22 to connect the second connection portions 221 and the first connection portions 101 and to prevent the article 10 on the second deck board 22 from falling. In addition, the fall prevention member 100 is stored in a storage compartment (not shown) such as a toolbox, and when the fall prevention member 100 is used, the fall prevention member 100 may be taken out of the storage compartment. In addition, the fall prevention member 100 may also be configured in an elastic structure so as to be compactly stored in the vehicle. For example, the fall prevention member 100 is configured of a plurality of members, during storage, the members are overlapped to reduce the fall prevention member 100. During use, the members are stretched to connect the members to enable the fall prevention member 100 to have a stretchable structure.

In addition, FIG. 3 illustrates a configuration example in which two fall prevention members 100 are detachably mounted to the end portion of the second deck board 22. However, a configuration example in which a single fall prevention member 100 is detachably mounted to the end portion of the second deck board 22 is possible. In this case, it is preferable that the length in the vehicle width direction of the fall prevention member 100 is large. Accordingly, even with the single fall prevention member 100, since the length in the vehicle width direction of the fall prevention member 100 is increased, the article 10 on the second deck board 22 may be prevented from falling.

In addition, in FIG. 3, for the single fall prevention member 100 having the first connection portions 101 with two bar shapes, the second connection portions 221 having two concave shapes are provided in the second deck board 22. In this case, the one second connection portion 221 having the concave shape may be configured such that a gap is not generated in a case where the first connection portion 101 having the bar shape is inserted into the second connection portion 221 having the concave shape, and the other second connection portion 221 having the concave shape may be configured such that a gap is generated in the vehicle width direction in a case where the other first connection portion 101 is inserted into the second connection portion 221 having the concave shape. Accordingly, even though the shapes of the fall prevention member 100 and the second deck board 22 are changed, the fall prevention member 100 may be detachably mounted to the second deck board 22.

In addition, the material of the fall prevention member 100 is not particularly limited and may be configured as an arbitrary material. For example, the material may be configured of a resin or a metal. In addition, the material may also be configured as the same material as that of the second deck board 22. In addition, the shape of the fall prevention member 100 is not particularly limited and may be configured as an arbitrary shape. For example, the fall prevention member 100 may be configured to have a cylindrical shape (a pipe shape having a cavity at the center) or the fall prevention member 100 may also be configured to have a columnar shape (a plate shape without a cavity at the center). In addition, the cross-sectional shape of the fall prevention member 100 is not particularly limited, and the cross-sectional shape of the fall prevention member 100 may also be configured as various shapes including a circle, a triangle, a trapezoid, and a quadrangle. Here, it is preferable that the fall prevention member 100 is configured in a shape in which the contact area with the article 10 is increased. In addition, since the fall prevention member 100 of this embodiment prevents the article 10 from falling by coming into contact with the article 10 and is detachable from the second deck board 22, it is preferable that the fall prevention member 100 is configured to have such a strength that deformation does not occur even when the article 10 comes into contact therewith, while also achieving a reduction in weight. Moreover, since the fall prevention member 100 of this embodiment is detachable from the second deck board 22 and thus needs to be detachably mounted to the rear surface side of the second deck board 22 or be stored in a storage compartment (not shown) such as a toolbox, it is preferable that the fall prevention member 100 is configured to have an elastic structure. In addition, since the fall prevention member 100 comes into contact with the article 10, it is preferable that the surface of the fall prevention member 100 is provided with a cushioning material such that the article 10 is not scratched even when the article 10 comes into contact with the fall prevention member 100.

<Action and Effect of Luggage Compartment Structure of Vehicle of Embodiment>

As such, the luggage compartment structure of a vehicle of this embodiment has the fall prevention member 100 which is a separate member from the second deck board 22 that is the plate member, the fall prevention member 100 has the first connection portions 101 connected to the second deck board 22, the first connection portions 101 are connected to the second connection portions 221 provided in the second deck board 22, and the fall prevention member 100 is detachable from the second deck board 22.

Accordingly, the fall prevention member 100 mounted to the second deck board 22 with the first connection portions 101 is disposed at a position that comes into contact with the article 10 placed on the second deck board 22 installed at the second position β and is thus able to prevent the article 10 from falling. Therefore, in the luggage compartment structure of a vehicle in which the second deck board 22 is able to be installed in various aspects in the luggage compartment 1 of the vehicle, the article 10 on the second deck board 22 may be prevented from falling using the fall prevention member 100 which is a separate member from the second deck board 22.

Second Embodiment

Next, a second embodiment will be described.

The first embodiment has the configuration example in which the fall prevention member 100 is detachably mounted to the second deck board 22 that is the plate member as illustrated in FIG. 3.

As illustrated in FIG. 4, the second embodiment has a configuration example in which a fall prevention member 100 is detachably mounted to both side walls (not shown) of the vehicle. Therefore, in a case of the configuration example of the second embodiment, both sides of the fall prevention member 100 are provided with first connection portions 101, and both side walls of the vehicle are provided with third connection portions 111. In addition, by connecting the first connection portions 101 provided at both ends of the fall prevention member 100 to the third connection portions 111 provided at both side walls of the vehicle, both ends of the fall prevention member 100 are detachably mounted to the side walls of the vehicle. In addition, the side walls of the vehicle to which the fall prevention member 100 is mounted mean points including a door trim and the like that constitute the side walls of the luggage compartment 1.

The configurations of the first connection portions 101 provided at both ends of the fall prevention member 100 and the third connection portions 111 provided at both side walls of the vehicle are not particularly limited, and any configuration may be applied as long as both ends of the fall prevention member 100 are detachably mounted to both side walls of the vehicle in the configuration. For example, the first connection portion 101 may be configured in a bar shape, the third connection portion 111 may be configured in a concave shape, and the first connection portion 101 having the bar shape is fitted into the third connection portion 111 having the concave shape so as to connect the first connection portion 101 to the third connection portion 111. Here, as illustrated in FIG. 4, the third connection portions 111 need to be provided at both side walls of the vehicle such that the article 10 comes into contact with the fall prevention member 100 when the article 10 placed on the second deck board 22 installed at the second position β moves to the rear of the vehicle.

In addition, as in the first embodiment, the fall prevention member 100 of this embodiment may be configured to be detachably mounted to the rear surface side of the second deck board 22 or the fall prevention member 100 may be stored in a storage compartment (not shown) such as a toolbox.

Figure 5:
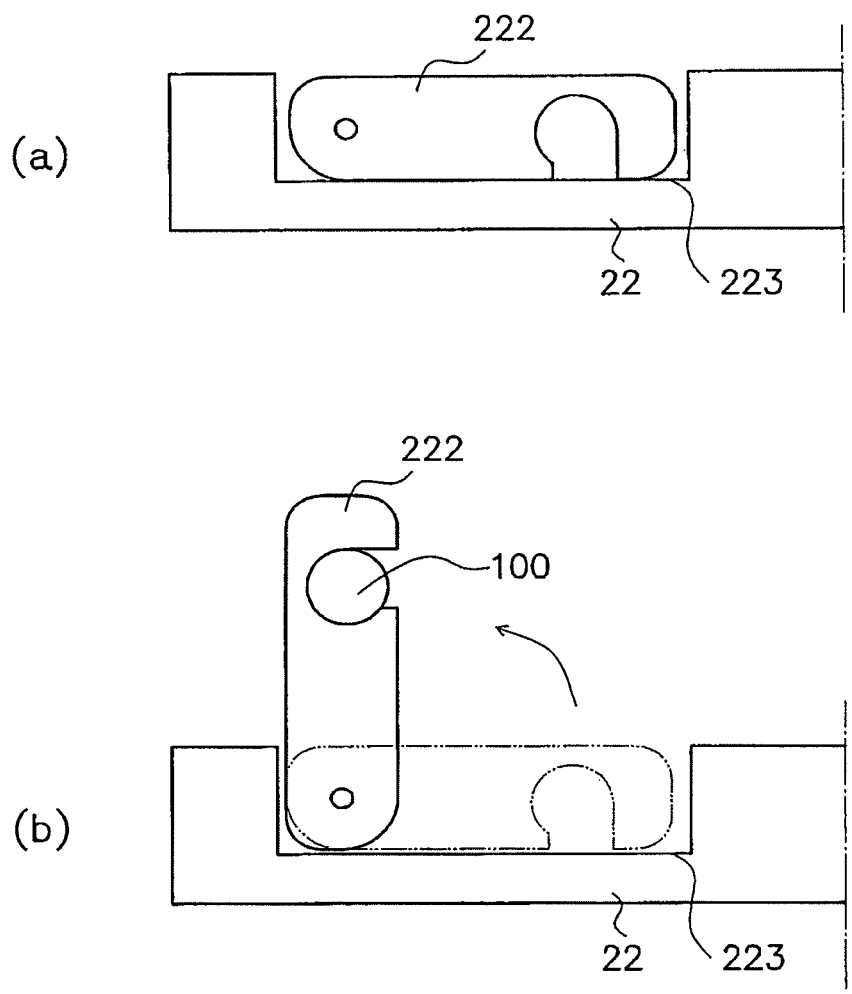
FIGS. 5A and 5B are diagrams illustrating a configuration example of a holding portion 222 disposed in the second deck board 22.

In addition, in the case of the luggage compartment structure of this embodiment, a part other than both ends (for example, a center portion) of the fall prevention member 100 may be held by a holding portion 222 provided in the second deck board 22. Accordingly, since the second deck board 22 and the fall prevention member 100 are connected at the holding portion 222, a deviation or the like of the second deck board 22 may be prevented. In the case of the luggage compartment structure of this embodiment, since the second deck board 22 is detachably mounted to the mounting portions 3 provided at both side walls of the vehicle, there may be cases where the second deck board 22 deviates from the position at which the second deck board 22 is mounted to the mounting portions 3 depending on the mounting structure of the second deck board 22 and the mounting portions 3. Therefore, it is preferable that a part other than both ends of the fall prevention member 100 is held by the holding portion 222 provided in the second deck board 22. Accordingly, a deviation of the second deck board 22 may be prevented. In addition, the structure of the holding portion 222 is not particularly limited and may be configured as an arbitrary structure. For example, as illustrated in FIGS. 5A and 5B, a storage portion 223 is provided in the second deck board 22, and the holding portion 222 and the second deck board 22 are connected such that the holding portion 222 is stored in the storage portion 223. In addition, in the case where the second deck board 22 is used at the first position α, as illustrated in FIG. 5A, the holding portion 222 is in a state of being stored in the storage portion 223. In addition, in the case where the second deck board 22 is used at the second position β, as illustrated in FIG. 5B, the holding portion 222 is taken out of the storage portion 223 such that the holding portion 222 is in a state of being erected. In addition, the fall prevention member 100 is fitted into the holding portion 222 in the erected state to connect the holding portion 222 to the fall prevention member 100. Accordingly, since the second deck board 22 and the fall prevention member 100 are connected at the holding portion 222, a deviation or the like of the second deck board 22 may be prevented. In addition, the structure for fitting the fall prevention member 100 to the holding portion 222 is not particularly limited and may be configured as an arbitrary structure.

In addition, the material of the fall prevention member 100 is not particularly limited as in the first embodiment and may be configured as an arbitrary material. In addition, the shape of the fall prevention member 100 is also not particularly limited and may be configured as an arbitrary shape. In addition, the cross-sectional shape of the fall prevention member 100 is also not particularly limited, and the cross-sectional shape of the fall prevention member 100 may also be configured as various shapes including a circle, a triangle, a trapezoid, and a quadrangle. In addition, since the fall prevention member 100 of this embodiment prevents the article 10 from falling by coming into contact with the article 10 and is detachable from both side walls of the vehicle, it is preferable that the fall prevention member 100 is configured to have such a strength that deformation does not occur even when the article 10 comes into contact therewith while achieving a reduction in weight. Moreover, since the fall prevention member 100 of this embodiment needs to be detachably mounted to the rear surface side of the second deck board 22 or be stored in a storage compartment (not shown) such as a toolbox, it is preferable that the fall prevention member 100 is configured to have an elastic structure. In addition, the fall prevention member 100 of this embodiment may not be configured as a linear bar-like member as illustrated in FIG. 4, but may be configured as a belt member such as a seat belt such that the fall prevention member 100 is rolled during storage and the fall prevention member 100 is in a stretched state during use. In addition, in the case where the fall prevention member 100 is configured as the belt member, hooks may be provided at both ends of the fall prevention member 100 as the first connection portions 101 and both side walls of the vehicle may be provided with hooking portions as the third connection portions 111 such that the hooks as the first connection portions 101 provided at both ends of the fall prevention member 100 hook the hooking portions as the third connection portions 111 provided in both side walls of the vehicle.

<Action and Effect of Luggage Compartment Structure of Vehicle of Embodiment>

As such, in the luggage compartment structure of a vehicle of this embodiment, the first connection portions 101 provided at both ends of the fall prevention member 100 are connected to the third connection portions 111 provided in both side walls (not shown) of the vehicle, and the fall prevention member 100 is detachable from both side walls of the vehicle.

Accordingly, the fall prevention member 100 mounted to both side walls of the vehicle with the first connection portions 101 is disposed at a position that comes into contact with the article 10 placed on the second deck board 22 installed at the second position β and is thus able to prevent the article 10 from falling. Therefore, in the luggage compartment structure of a vehicle in which the second deck board 22 is able to be installed in various aspects in the luggage compartment 1 of the vehicle, the article 10 on the second deck board 22 may be prevented from falling using the fall prevention member 100 which is a separate member from the second deck board 22.

Third Embodiment

Next, a third embodiment will be described.

The second embodiment has the configuration example in which both ends of the fall prevention member 100 are detachably mounted to both side walls of the vehicle as illustrated in FIG. 4.

Figure 6:
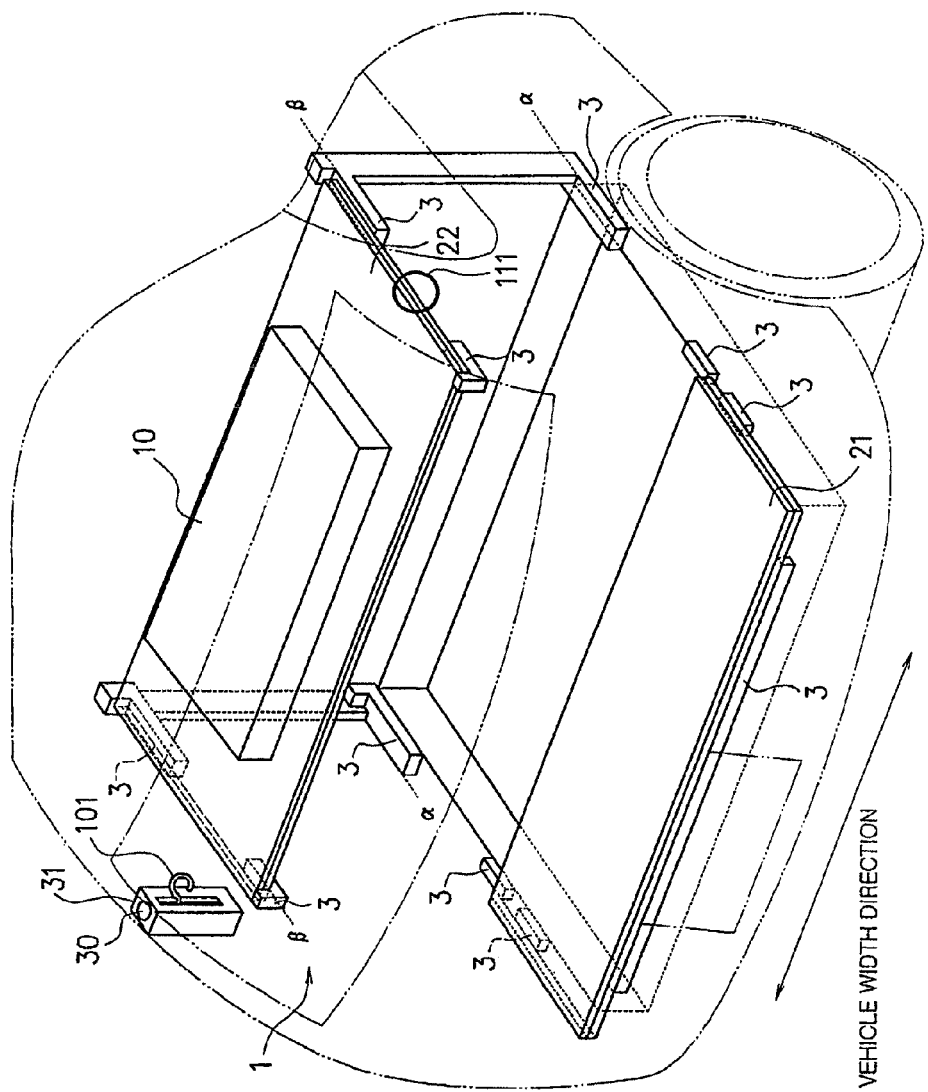
FIG. 6 is a first diagram illustrating a configuration example of the luggage compartment 1 of the vehicle of a third embodiment.
Figure 7:
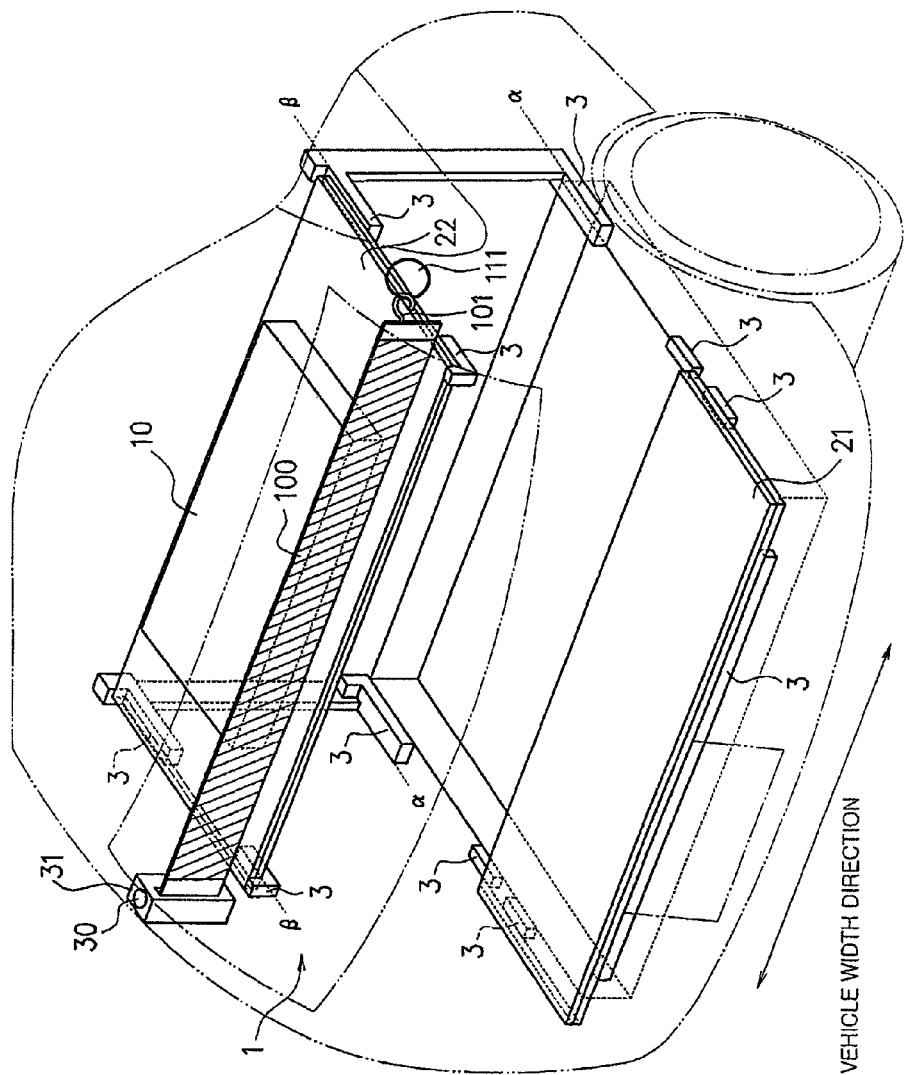
FIG. 7 is a second diagram illustrating the configuration example of the luggage compartment 1 of the vehicle of the third embodiment.

In the third embodiment, a fall prevention member 100 is configured as a belt member such as a seat belt. In addition, as illustrated in FIG. 6, a storage portion 31 is provided in one side wall of the vehicle and the fall prevention member 100 configured as the above-mentioned belt member is rolled to be stored in the storage portion 31. In this case, a roller 30 is provided in the storage portion 31, one end portion of the fall prevention member 100 is connected to the roller 30, and the fall prevention member 100 is wound around the roller 30 to be stored. In addition, when the fall prevention member 100 is used, as illustrated in FIG. 7, the fall prevention member 100 is pulled from the storage portion 31, and a first connection portion 101 provided at the other end portion of the fall prevention member 100 is connected to a third connection portion 111 provided in the other side wall of the vehicle. Accordingly, the fall prevention member 100 mounted to the other side wall of the vehicle with the first connection portion 101 is disposed at a position that comes into contact with the article 10 placed on the second deck board 22 installed at the second position β and thus prevents the article 10 from falling. In addition, since the fall prevention member 100 is able to be stored in the storage portion 31 and managed, the loss of the fall prevention member 100 may be prevented. In addition, the structure for storing the fall prevention member 100 in the storage portion 31 or pulling the fall prevention member 100 from the storage portion 31 may use a structure such as a seat belt for ease of winding the fall prevention member 100 around the roller 30 to be stored in the storage portion 31 and pulling the fall prevention member 100 from the storage portion 31.

In addition, the configurations of the first connection portion 101 provided in the fall prevention member 100 and the third connection portion 111 provided in the side wall of the vehicle are not particularly limited, and any configuration may be applied as long as the one end of the fall prevention member 100 is able to be detachably mounted to the one side wall of the vehicle. For example, a hook may be provided as the first connection portion 101 in the one end of the fall prevention member 100 and a hooking portion may be provided as the third connection portion 111, in the one side wall of the vehicle such that the hook as the first connection portion 101 provided in the one end of the fall prevention member 100 hooks the hooking portion as the third connection portion 111 provided in the one side wall of the vehicle.

In addition, even in the configuration of this embodiment, as in the third embodiment illustrated in FIG. 4, a holding portion 222 may be provided in the second deck board 22 such that the holding portion 222 holds the fall prevention member 100 pulled from the storage portion 31. Here, in this case, for example, a structure in which a hooking portion is provided in the holding portion 222 and the belt member is hooked by the hooking portion to cause the holding portion 222 to hold the fall prevention member 100 is needed.

<Action and Effect of Luggage Compartment Structure of Vehicle of Embodiment>

As such, in the luggage compartment structure of a vehicle of this embodiment, the fall prevention member 100 is stored in the storage portion 31 provided in the one side wall of the vehicle, and the one end portion of the fall prevention member 100 is mounted to the storage portion 31. In addition, the first connection portion 101 provided in the other end portion of the fall prevention member 100 and the third connection portion 111 provided in the other side wall of the vehicle are connected to each other, and the other end portion of the fall prevention member 100 is detachable from the vehicle.

Accordingly, the fall prevention member 100 mounted to the other side wall of the vehicle with the first connection portion 101 is disposed at a position that comes into contact with the article 10 placed on the second deck board 22 installed at the second position β and is thus able to prevent the article 10 from falling. Therefore, in the luggage compartment structure of a vehicle in which the second deck board 22 is able to be installed in various aspects in the luggage compartment 1 of the vehicle, the article 10 on the second deck board 22 may be prevented from falling using the fall prevention member 100 which is a separate member from the second deck board 22. In addition, since the fall prevention member 100 is able to be stored in the storage portion 31 provided in the vehicle and managed, the loss of the fall prevention member 100 may be prevented and the fall prevention member 100 may be easily used.

Fourth Embodiment

Next, a fourth embodiment will be described.

In the second and third embodiments, the fall prevention member 100 is mounted to the vehicle such that the fall prevention member 100 is positioned at the end portion on the rear side of the vehicle of the second deck board 22. In addition, the article 10 on the second deck board 22 is prevented from falling using the fall prevention member 100.

In the fourth embodiment, a fall prevention member 100 is mounted to the vehicle so as to cover a part of the upper surface of the second deck board 22 with the fall prevention member 100. In addition, the article 10 on the second deck board 22 is interposed between the fall prevention member 100 and the upper surface of the second deck board 22 to fix the article 10 to the upper surface of the second deck board 22. Accordingly, the article 10 placed on the second deck board 22 is in a state of being fixed onto the second deck board 22, and thus the article 10 is prevented from falling and vibrations, deviations, and the like of the article 10 may be prevented. In addition, since the part of the upper surface of the second deck board 22 is covered using the fall prevention member 100, vibrations, deviations, and the like of the second deck board 22 itself may also be prevented. Here, in this embodiment, the fall prevention member 100 needs to be provided in both side walls of the vehicle such that the article 10 on the second deck board 22 is interposed between the fall prevention member 100 and the upper surface of the second deck board 22.

Figure 8:
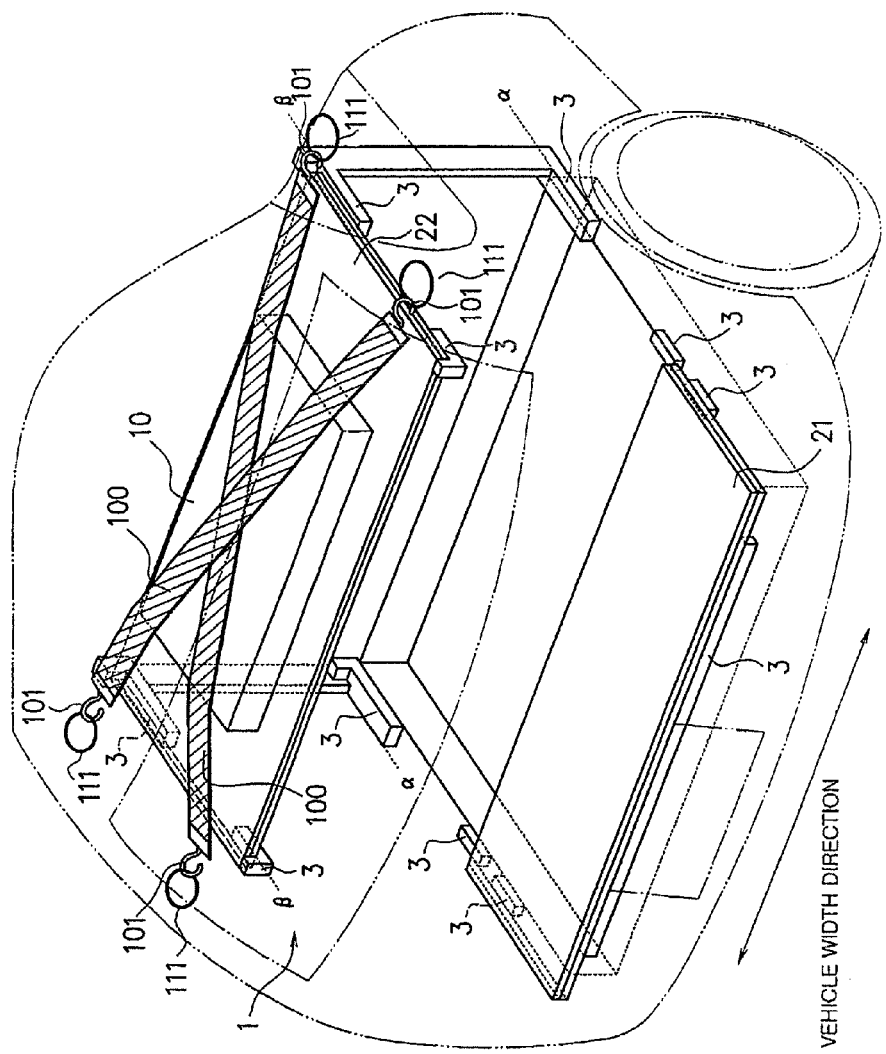
FIG. 8 is a diagram illustrating a configuration example of the luggage compartment 1 of the vehicle of a fourth embodiment.

Therefore, in this embodiment, as illustrated in FIG. 8, first connection portions 101 are provided in both sides of the fall prevention member 100, and third connection portions 111 are provided in both side walls of the vehicle. In addition, the part of the upper surface of the second deck board 22 is covered using the fall prevention member 100 by connecting the first connection portions 101 provided at both ends of the fall prevention member 100 to the third connection portions 111 provided in both side walls of the vehicle, and both ends of the fall prevention member 100 are detachably mounted to the side walls of the vehicle. Accordingly, the article 10 on the second deck board 22 may be interposed between the fall prevention member 100 and the upper surface of the second deck board 22.

In addition, the configurations of the first connection portions 101 provided at both ends of the fall prevention member 100 and the third connection portions 111 provided in both side walls of the vehicle are not particularly limited, and any configuration may be applied as long as both ends of the fall prevention member 100 are able to be detachably mounted to both side walls of the vehicle. For example, hooks may be provided as the first connection portions 101 at both ends of the fall prevention member 100 and hooking portions may be provided as the third connection portions 111 in both side walls of the vehicle such that the hooks as the first connection portions 101 provided at both ends of the fall prevention member 100 hook the hooking portions as the third connection portions 111 provided in both side walls of the vehicle. Here, in this embodiment, it is preferable that the fall prevention member 100 is configured as a strap, belt member, or the like such that the article 10 on the second deck board 22 is interposed between the fall prevention member 100 and the upper surface of the second deck board 22. In addition, it is preferable that fall prevention member 100 is configured as an elastic member. In addition, in the case where the fall prevention member 100 is configured as the strap, belt member, or the like, when the article 10 has a handle or a hole, the article 10 may be fixed by the fall prevention member 100 through the handle or the hole.

In addition, as in the second embodiment, the fall prevention member 100 of this embodiment may be configured to be detachably mounted to the rear surface side of the second deck board 22 or the fall prevention member 100 may be stored in a storage compartment (not shown) such as a toolbox. In addition, as in the third embodiment, a configuration in which the fall prevention member 100 is stored in the storage portion 31 provided in the one side wall of the vehicle, the first connection portion 101 provided in the other end portion of the fall prevention member 100 and the third connection portion 111 provided in the other side wall of the vehicle are connected to each other, and the other end portion of the fall prevention member 100 is detachable from the vehicle is possible.

In addition, in this embodiment, since the article 10 on the second deck board 22 is interposed between the fall prevention member 100 and the upper surface of the second deck board 22, it is preferable that the third connection portions 111 are installed at a plurality of points in both side walls of the vehicle. In this case, a method of hanging the fall prevention member 100 may be appropriately changed depending on the size and the shape of the article 10 placed on the second deck board 22.

<Action and Effect of Luggage Compartment Structure of Vehicle of Embodiment>

As such, in the luggage compartment structure of a vehicle of this embodiment, the fall prevention member 100 is detachable from the vehicle such that the fall prevention member 100 covers a region of at least a part of the upper surface of the second deck board 22.

Accordingly, in the luggage compartment structure of a vehicle in which the plate member 22 may be installed in various aspects in the luggage compartment 1 of the vehicle, the article 10 on the second deck board 22 may be prevented from falling using the fall prevention member 100 which is a separate member from the second deck board 22. In addition, since the article 10 placed on the second deck board 22 is in the state of being fixed onto the second deck board 22, the article 10 is prevented from falling and vibrations, deviations, and the like of the article 10 may be prevented. In addition, since the part of the upper surface of the second deck board 22 is covered using the fall prevention member 100, vibrations, deviations, and the like of the second deck board 22 itself may also be prevented.

In addition, the above-described embodiments are embodiments appropriate for the present invention, the scope of the present invention is not limited only to the embodiments, and various modifications of the embodiments may be made without departing from the gist of the present invention.

For example, each of the above-described embodiments has a structure in which the second deck board 22 is installed in various aspects in the height direction of the vehicle in the luggage compartment 1. However, a structure in which the first deck board 21 is also able to be installed in various aspects in the height direction of the vehicle in the luggage compartment 1, like the second deck board 22 is possible. In this case, it is preferable that the fall prevention member 100 is installed as in each of the above-described embodiments to prevent the article 10 on the first deck board 21 from falling.

In addition, in each of the above-described embodiments, the deck boards are exemplified in the description. However, the embodiments are not limited to the deck boards, plate members such as a package tray, floor tray, or the like may also be applied.

What is claimed is:

1. A luggage compartment structure of a vehicle comprising:
    a plate member installed between mounting portions in one of two positions including a first position and a second position that is higher than the first position of a luggage compartment of the vehicle;
    a fall prevention member which prevents an article placed on the plate member installed at the second position from falling, the fall prevention member having a first end portion and a second end portion and being detachable from the plate member;
    a first connection portion provided on each of the first end portion and the second end portion of the fall prevention member; and
    a pair of second connection portions provided on the plate member, each of the second connection portions configured to detachably connect to a respective first connection portion;
    wherein the fall prevention member is detachable from a rear surface of the plate member.

2. The luggage compartment structure of a vehicle according to claim 1,
    wherein the fall prevention member is configured as a bent bar-like member, and
    both end portions of the fall prevention member are detachable from the plate member.

3. The luggage compartment structure of a vehicle according to claim 2,
    wherein each of the second connection portions are configured in a concave shape, and each of the first connection portions are configured in a bar shape inserted in a respective second connection portion to connect the second connection portions and the first connection portions and detachably mount the fall prevention member.

4. The luggage compartment structure of a vehicle according to claim 2,
    wherein the bent bar-like member includes a plurality of overlapping members, reducing the bent bar-like member size.

5. The luggage compartment structure of a vehicle according to claim 2,
    wherein the fall prevention member includes a first bent bar-like member and a second bent bar-like member.

6. The luggage compartment structure of a vehicle according to claim 1,
    wherein the fall prevention member is a linear bar-like member.

7. The luggage compartment structure of a vehicle according to claim 6,
    wherein the fall prevention member covers a region of at least a part of an upper surface of the plate member.

8. The luggage compartment structure of a vehicle according to claim 1,
    wherein the fall prevention member is held at the rear surface of the plate member.

9. A luggage compartment structure of a vehicle comprising:
    a plate member installed between mounting portions in one of two positions including a first position and a second position that is higher than the first position of a luggage compartment of the vehicle;
    a fall prevention member which prevents an article placed on the plate member installed at the second position from falling, the fall prevention member having a first end portion and a second end portion and being detachable from the plate member;
    a first connection portion provided on each of the first end portion and the second end portion of the fall prevention member; and
    a pair of second connection portions provided on the plate member, each of the second connection portions configured to detachably connect to a respective first connection portion;
    wherein the fall prevention member is configured as a bent bar, and
    both end portions of the fall prevention member are detachable from the plate member.

* * * * *